United States Patent
Bhargava et al.

(10) Patent No.: US 11,431,666 B2
(45) Date of Patent: Aug. 30, 2022

(54) MACHINE LEARNING-BASED RECOMMENDATIONS FOR MODIFYING DELIVERY OF NOTIFICATIONS

(71) Applicant: EMC IP Holding Company LLC, Hopkinton, MA (US)

(72) Inventors: Vivek Bhargava, Bangalore (IN); Shubham Gupta, Jaipur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/944,429

(22) Filed: Jul. 31, 2020

(65) Prior Publication Data
US 2022/0038410 A1  Feb. 3, 2022

(51) Int. Cl.
*H04L 51/224* (2022.01)
*G06N 20/00* (2019.01)
*H04L 51/234* (2022.01)
*H04L 51/046* (2022.01)
*G06Q 10/06* (2012.01)

(52) U.S. Cl.
CPC .......... *H04L 51/224* (2022.05); *G06N 20/00* (2019.01); *H04L 51/046* (2013.01); *H04L 51/234* (2022.05); *G06Q 10/06393* (2013.01)

(58) Field of Classification Search
CPC ....... H04L 51/24; H04L 51/34; H04L 51/046; H04L 51/224; H04L 51/234; H04L 51/214; H04L 51/18; G06N 20/00; G06N 3/08; G06Q 10/06393
See application file for complete search history.

(56) References Cited

U.S. PATENT DOCUMENTS

| | | | |
|---|---|---|---|
| 2010/0042470 A1* | 2/2010 | Chang | G06Q 30/0241 705/14.64 |
| 2015/0133098 A1* | 5/2015 | Warr | H04W 68/04 455/418 |

(Continued)

OTHER PUBLICATIONS

Microsoft, "What is Azure Notification Hubs?" https://docs.microsoft.com/en-us/azure/notification-hubs/notification-hubs-push-notification-overview, Accessed Jul. 30, 2020, 5 pages.

(Continued)

*Primary Examiner* — Soe Hlaing
(74) *Attorney, Agent, or Firm* — Ryan, Mason & Lewis, LLP

(57) ABSTRACT

An apparatus comprises a processing device configured to select a given notification to be delivered from a first computing device to a second computing device and to determine (i) first notification metrics associated with one or more previous notifications delivered to a set of one or more computing devices including the second computing device and (ii) second notification metrics associated with a current status of the second computing device. The processing device is also configured to provide the first and second notification metrics to one or more machine learning models, to identify recommendations for modifying delivery of the given notification from the first computing device to the second computing device based on output of the one or more machine learning models, and to modify the delivery of the given notification from the first computing device to the second computing device based on the identified recommendations.

20 Claims, 7 Drawing Sheets

(56) References Cited

U.S. PATENT DOCUMENTS

| | | | |
|---|---|---|---|
| 2016/0014057 A1* | 1/2016 | Gudla | H04L 63/08 709/206 |
| 2016/0234553 A1* | 8/2016 | Hampson | H04W 4/029 |
| 2017/0149706 A1* | 5/2017 | Amble | H04L 67/306 |
| 2018/0013698 A1* | 1/2018 | Vendrow | H04L 67/327 |
| 2018/0167342 A1* | 6/2018 | Lewis | H04L 51/043 |

OTHER PUBLICATIONS

A. Quesada, "5 Algorithms to Train a Neural Network," Neural Designer, https://www.neuraldesigner.com/blog/5_algorithms_to_train_a_neural_network, Accessed Jul. 30, 2020, 15 pages.

Amazon, "Amazon Simple Notification Service," https://aws.amazon.com/sns/?whats-new-cards.sort-by=item.additionalFields.postDateTime&whats-new-cards.sort-order=desc, Accessed Jul. 30, 2020, 13 pages.

Google, "Firebase," https://firebase.google.com/?gclid=CjwKCAjw34n5BRA9EiwA2u9k3_One-0QNCvhZCHYvXP3rm-7argXYh-1B-YOXnz5rbYlqZBkE6M9_BoCUOcQAv%E2%80%A6, Accessed Jul. 30, 2020, 16 pages.

H. P. Gavin, "The Levenberg-Marquardt Algorithm for Nonlinear Least Squares Curve-Fitting Problems," Duke University, Aug. 3, 2019, 20 pages.

* cited by examiner

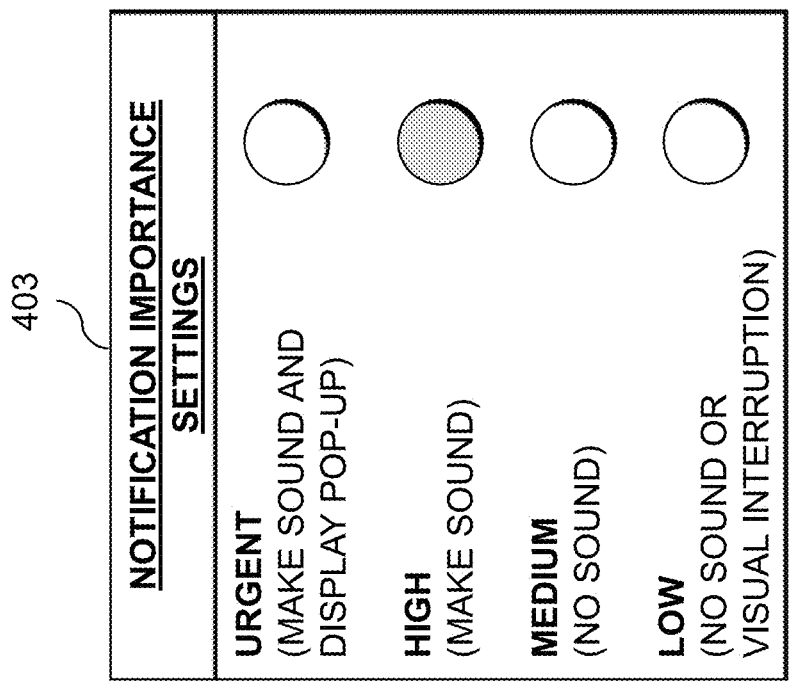
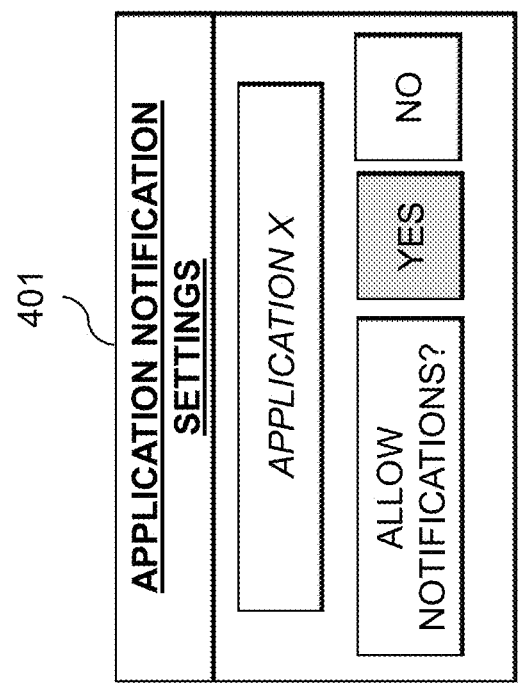
FIG. 4

MACHINE LEARNING-BASED RECOMMENDATIONS FOR MODIFYING DELIVERY OF NOTIFICATIONS

FIELD

The field relates generally to information processing, and more particularly to techniques for notification management.

BACKGROUND

Notifications are commonly used by many applications, such as mobile applications running on a mobile device. Notifications may be used for many different purposes, including but not limited to increasing user activity or engagement with a particular product or service. Consider, as an example, a mobile device such as a smartphone that typically has dozens of mobile applications installed thereon. Some or all of such mobile applications may regularly send notifications to the user of the device, such as using push mechanisms. Depending on the number of applications installed thereon, a user may be overwhelmed with a large number of notifications that continually distract the user from performing important tasks.

SUMMARY

Illustrative embodiments of the present invention provide techniques for generating recommendations for modifying the delivery of notifications utilizing machine learning.

In one embodiment, an apparatus comprises at least one processing device comprising a processor coupled to a memory. The at least one processing device is configured to perform the steps of selecting a given notification to be delivered from a first computing device to a second computing device and determining (i) first notification metrics associated with one or more previous notifications delivered to a set of one or more computing devices including the second computing device and (ii) second notification metrics associated with a current status of the second computing device. The at least one processing device is also configured to perform the steps of providing the first notification metrics and the second notification metrics to one or more machine learning models, identifying one or more recommendations for modifying delivery of the given notification from the first computing device to the second computing device based at least in part on output of the one or more machine learning models, and modifying the delivery of the given notification from the first computing device to the second computing device based at least in part on the identified one or more recommendations.

These and other illustrative embodiments include, without limitation, methods, apparatus, networks, systems and processor-readable storage media.

BRIEF DESCRIPTION OF THE DRAWINGS

FIG. 4 shows an example of interfaces for controlling notification settings in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
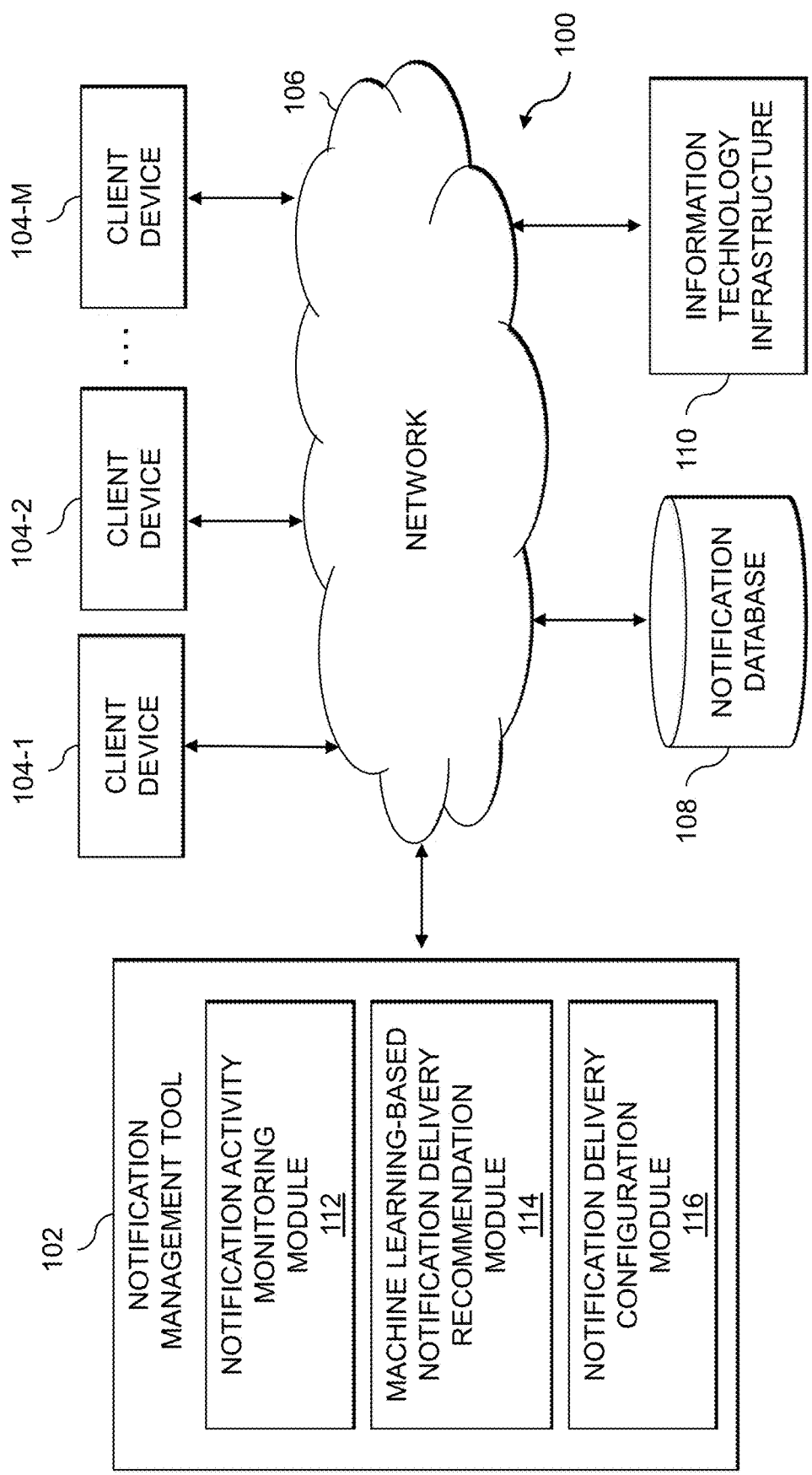
FIG. 1 is a block diagram of an information processing system for generating recommendations for modifying the delivery of notifications utilizing machine learning in an illustrative embodiment of the invention.

FIG. 1 shows an information processing system 100 configured in accordance with an illustrative embodiment. The information processing system 100 is assumed to be built on at least one processing platform and provides functionality for generating recommendations for modifying the delivery of notifications utilizing machine learning. The information processing system 100 includes a notification management tool 102 and a plurality of client devices 104-1, 104-2, . . . 104-M (collectively client devices 104). The notification management tool 102 and client devices 104 are coupled to a network 106. Also coupled to the network 106 is a notification database 108, which may store various information relating to management of notifications for client devices 104 and a plurality of assets of information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), software containers, etc.

The assets of the IT infrastructure 110 (e.g., physical and virtual computing resources thereof) may host applications that are utilized by respective ones of the client devices 104, such as in accordance with a client-server computer program architecture. In some embodiments, the applications comprise web applications designed for delivery from assets in the IT infrastructure 110 to users (e.g., of client devices 104) over the network 106. Various other examples are possible, such as where one or more applications are used internal to the IT infrastructure 110 and not exposed to the client devices 104. While some embodiments are described with respect to management of notifications to be delivered from assets of the IT infrastructure 110 to the client devices 104, it should be appreciated that in other embodiments one or more of the assets of the IT infrastructure 110 may be the destination for notifications and the notification management techniques described herein may be used for controlling or managing delivery of notifications to assets of the IT infrastructure 110.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The notification database 108, as discussed above, is configured to store and record information relating to management of notifications. Such information may include, for example, various notification parameters or metrics derived from monitoring delivery of notifications (e.g., from assets of the IT infrastructure 110 to the client devices 104), application and notification usage patterns, etc. Various other information may be stored in the notification database 108 in other embodiments as discussed in further detail below.

The notification database 108 in some embodiments is implemented using one or more storage systems or devices associated with the notification management tool 102. In some embodiments, one or more of the storage systems utilized to implement the notification database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the notification management tool 102, as well as to support communication between the notification management tool 102 and other related systems and devices not explicitly shown.

The client devices 104 are configured to access or otherwise utilize assets of the IT infrastructure 110 (e.g., hardware assets, applications or other software running on or hosted by such hardware assets, etc.). In some embodiments, the assets (e.g., physical and virtual computing resources) of the IT infrastructure 110 are operated by or otherwise associated with one or more companies, businesses, organizations, enterprises, or other entities. For example, in some embodiments the assets of the IT infrastructure 110 may be operated by a single entity, such as in the case of a private data center of a particular company. In other embodiments, the assets of the IT infrastructure 110 may be associated with multiple different entities, such as in the case where the assets of the IT infrastructure 110 provide a cloud computing platform or other data center where resources are shared amongst multiple different entities.

The term "user" herein is intended to be broadly construed so as to encompass numerous arrangements of human, hardware, software or firmware entities, as well as combinations of such entities.

In the present embodiment, alerts or notifications generated by assets of the IT infrastructure 110 are provided over network 106 to client devices 104, or to other ones of the assets of the IT infrastructure 110 via one or more host agents. In some cases, one or more of the client devices 104 may also provide notifications to the assets of the IT infrastructure 110. The notification management tool 102 is illustratively configured to monitor the delivery of notifications as well as how notifications are utilized (e.g., open rate) and to make recommendations on how and whether to modify delivery of future notifications. This may include, for example, recommending that certain notifications be delivered at different times or not at all. In this way, the cost of delivering notifications (e.g., such as in terms of network and other compute resources utilized) may be reduced. The notification management tool 102 may also provide alerts (e.g., when the delivery of notifications has been modified) to client devices 104, or to a system administrator, IT manager, or other authorized personnel via the one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the notification management tool 102. For example, a given host agent may comprise a mobile telephone equipped with a mobile application configured to deliver or receive notifications, or to provide alerts when the delivery or receipt of notifications has been modified.

It should be noted that a "host agent" as this term is generally used herein may comprise an automated entity, such as a software entity running on a processing device. Accordingly, a host agent need not be a human entity.

The notification management tool 102 in the FIG. 1 embodiment is assumed to be implemented using at least one processing device. Each such processing device generally comprises at least one processor and an associated memory, and implements one or more functional modules for controlling certain features of the notification management tool 102. In the FIG. 1 embodiment, the notification management tool 102 comprises a notification activity monitoring module 112, a machine learning-based notification delivery recommendation module 114, and a notification delivery configuration module 116.

The notification management tool 102 is configured to select a given notification to be delivered from a first computing device (e.g., from an asset of the IT infrastructure 110) to a second computing device (e.g., one of the client devices 104, such as client device 104-1). For example, the first computing device may subscribe to a service provided by the notification management tool 102 for obtaining recommendations regarding how to deliver notifications (e.g., including the given notification) to achieve one or more objectives (e.g., increasing open rates, reducing the cost of notification delivery, etc.). The notification management tool 102 may also or alternatively be a service that is subscribed to by potential recipients of notifications (e.g., including the given notification) to achieve one or more objectives (e.g., for reducing or managing the time and manner in which notifications are delivered, etc.).

The notification activity monitoring module 112 is configured to determine first notification metrics associated with one or more previous notifications delivered to a set of one or more computing devices (e.g., client devices 104) including the second computing device. The notification activity monitoring module 112 is also configured to determine second notification metrics associated with a current status of the second computing device. The first notification metrics may include one or more key performance indicators (KPIs), where the KPIs indicate respective proportions of recipients of each of the one or more previous notifications that opened and dismissed the one or more previous notifications. The KPIs may be determined with various levels of granularity, such as any combination of: by communication channel; by notification format; by geographic region; by notification category; etc. The second notification metrics may include: determining whether the second computing device is offline or has a "Do Not Disturb" or other similar status enabled; determining notification delivery preferences of the second computing device for each of one or more notification categories; analyzing times at which the second computing device opened and dismissed notifications during a historical time period; analyzing notification categories of notifications which the second computing device opened and dismissed during the historical time period; determining one or more applications utilized by the second computing device; determining an average application session time for the one or more applications utilized by the second computing device; determining a current location of the second computing device; determining a predicted location of the second computing device at a time at which the given notification is scheduled to be delivered from the first computing device to the second computing device; etc.

The machine learning-based notification delivery recommendation module 114 is configured to receive the first and second notification metrics and provide them as input to one or more machine learning models. Output from the one or more machine learning models is used to identify recommendations for modifying the delivery of the given notification from the first computing device to the second computing device. The one or more machine learning models may comprise a time series algorithm configured to predict one or more times at which a likelihood of the second computing device opening the given notification exceeds a designated threshold, and the one or more recommendations for modifying the delivery of the given notification from the first computing device to the second computing device may comprise a recommended time at which to deliver the given notification. The one or more machine learning models may also or alternatively comprise a Levenberg-Marquardt algorithm configured to determine at least one of a priority of the given notification relative to one or more other notifications to be delivered to the second computing device and a grouping of the given notification with at least one of the one or more other notifications to be delivered to the second computing device which increases a likelihood of the second computing device opening the given notification by a designated threshold, and the one or more recommendations for modifying the delivery of the given notification from the first computing device to the second computing device may comprise at least one of a recommended order in which the given notification and the one or more other notifications should be delivered to the second computing device and a recommended grouping of the given notification with at least one of the one or more other notifications or delivery to the second computing device.

The notification delivery configuration module 116 is configured to modify the delivery of the given notification from the first computing device to the second computing device based at least in part on the recommendations identified by the machine learning-based notification delivery recommendation module 114. Modifying the delivery of the given notification from the first computing device to the second computing device may comprise modifying at least one of: a time at which the given notification is delivered from the first computing device to the second computing device; a channel by which the given notification is delivered from the first computing device to the second computing device; and a format of the given notification.

It is to be appreciated that the particular arrangement of the notification management tool 102, client devices 104, notification database 108 and IT infrastructure 110 illustrated in the FIG. 1 embodiment is presented by way of example only, and alternative arrangements can be used in other embodiments. For example, the notification management tool 102, or one or more portions thereof such as the notification activity monitoring module 112, the machine learning-based notification delivery recommendation module 114, and the notification delivery configuration module 116, may in some embodiments be implemented internal to one or more of the client devices 104 or the IT infrastructure 110. As another example, the functionality associated with the notification activity monitoring module 112, the machine learning-based notification delivery recommendation module 114, and the notification delivery configuration module 116 may be combined into one module, or separated across more than three modules with the multiple modules possibly being implemented with multiple distinct processors or processing devices.

At least portions of the notification activity monitoring module 112, the machine learning-based notification delivery recommendation module 114, and the notification delivery configuration module 116 may be implemented at least in part in the form of software that is stored in memory and executed by a processor.

It is to be understood that the particular set of elements shown in FIG. 1 for generating recommendations for modifying the delivery of notifications utilizing machine learning is presented by way of illustrative example only, and in other embodiments additional or alternative elements may be used. Thus, another embodiment may include additional or alternative systems, devices and other network entities, as well as different arrangements of modules and other components.

The notification management tool 102 may be part of or otherwise associated with another system, such as a governance, risk and compliance (GRC) system, a distributed notification platform, a security operations center (SOC), a critical incident response center (CIRC), a security analytics system, a security information and event management (SIEM) system, etc.

The notification management tool 102, and other portions of the system 100, in some embodiments, may be part of cloud infrastructure as will be described in further detail below. The cloud infrastructure hosting the notification management tool 102 may also host any combination of the notification management tool 102, one or more of the client devices 104, the notification database 108 and the IT infrastructure 110.

The notification management tool 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the notification management tool 102 or components thereof (e.g., the notification activity monitoring module 112, the machine learning-based notification delivery recommendation module 114, and the notification delivery configuration module 116) may be implemented on respective distinct processing platforms, although numerous other arrangements are possible. For example, in some embodiments at least portions of the notification management tool 102 and one or more of the client devices 104 are implemented on the same processing platform. A given client device (e.g., 104-1) can therefore be implemented at least in part within at least one processing platform that implements at least a portion of the notification management tool 102. Similarly, at least a portion of the notification management tool 102 may be implemented at least in part within at least one processing platform that implements at least a portion of the IT infrastructure 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the notification management tool 102, the client devices 104, the notification database 108 and the IT infrastructure 110, or portions or components thereof, to reside in different data centers. Numerous other distributed implementations are possible. The notification management tool 102 can also be implemented in a distributed manner across multiple data centers.

Additional examples of processing platforms utilized to implement the notification management tool 102 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for generating recommendations for modifying the delivery of notifications utilizing machine learning will now be described in more detail with reference to the flow diagram of FIG. 2. It is to be understood that this particular process is only an example, and that additional or alternative processes for generating recommendations for modifying the delivery of notifications utilizing machine learning can be carried out in other embodiments.

In this embodiment, the process includes steps 200 through 208. These steps are assumed to be performed by the notification management tool 102 utilizing the notification activity monitoring module 112, the machine learning-based notification delivery recommendation module 114 and the notification delivery configuration module 116. The process begins with step 200, selecting a given notification to be delivered from a first computing device (e.g., from an asset of the IT infrastructure 110) to a second computing device (e.g., one of the client devices 104, such as client device 104-1). In step 202, first notification metrics and second notification metrics are determined. The first notification metrics are associated with one or more previous notifications delivered to a set of one or more computing devices (e.g., the client devices 104) including the second computing device. The second notification metrics are associated with a current status of the second computing device.

In some embodiments, the first notification metrics determined in step 202 include one or more key performance indicators (KPIs), where the KPIs indicate respective proportions of recipients of each of the one or more previous notifications that opened and dismissed the one or more previous notifications. The KPIs may be determined with various levels of granularity, such as any combination of: by communication channel; by notification format; by geographic region; by notification category; etc. The KPIs, for example, may characterize for each of two or more different communication channels (e.g., different application programming interfaces (APIs), different network protocols, etc.), first and second proportion of the recipients which opened and dismissed the one or more previous notifications delivered via the different communication channels. The KPIs, as another example, may characterize for each of two or more different notification formats (e.g., short-form text less than some designated number of characters such as 140, 160, 280 or other desired limit, long-form text that exceeds the designated number of characters, an image format, etc.), first and second proportions of the recipients which opened and dismissed the one or more previous notifications delivered using the different notification formats. The KPIs, as a further example, may characterize for each of two or more different geographic regions, first and second proportions of the recipients which opened and dismissed the one or more previous notifications delivered in the different geographic regions. The KPIs, as yet another example, may specify, for a particular notification category (e.g., schedule changes, new tasks, chat messages, etc.), first and second proportions of the recipients which opened and dismissed the one or more previous notifications for that notification category.

Determining the second notification metrics in step 202 may include determining whether the second computing device is offline, has a "Do Not Disturb" or other similar status enabled, etc. Determining the second notification metrics in step 202 may also or alternatively include determining notification delivery preferences of the second computing device for each of one or more notification categories. For example, one or more users of the second computing device may set preferences for the types of notifications that such users deem critical or non-critical, important or non-important, etc. Additionally or alternatively, such preferences may be determined by analyzing past usage by the second computing device over some historical time period. This may include analyzing times at which the second computing device opened and dismissed notifications during a historical time period, notification categories of notifications which the second computing device opened and dismissed during the historical time period, etc.

Determining the second notification metrics in step 202 may further or alternatively include one or more of: determining at least one of one or more applications utilized by the second computing device; determining an average application session time for the one or more applications utilized by the second computing device; determining a current location of the second computing device; determining a predicted location of the second computing device at a time at which the given notification is scheduled to be delivered from the first computing device to the second computing device; etc.

Figure 2:
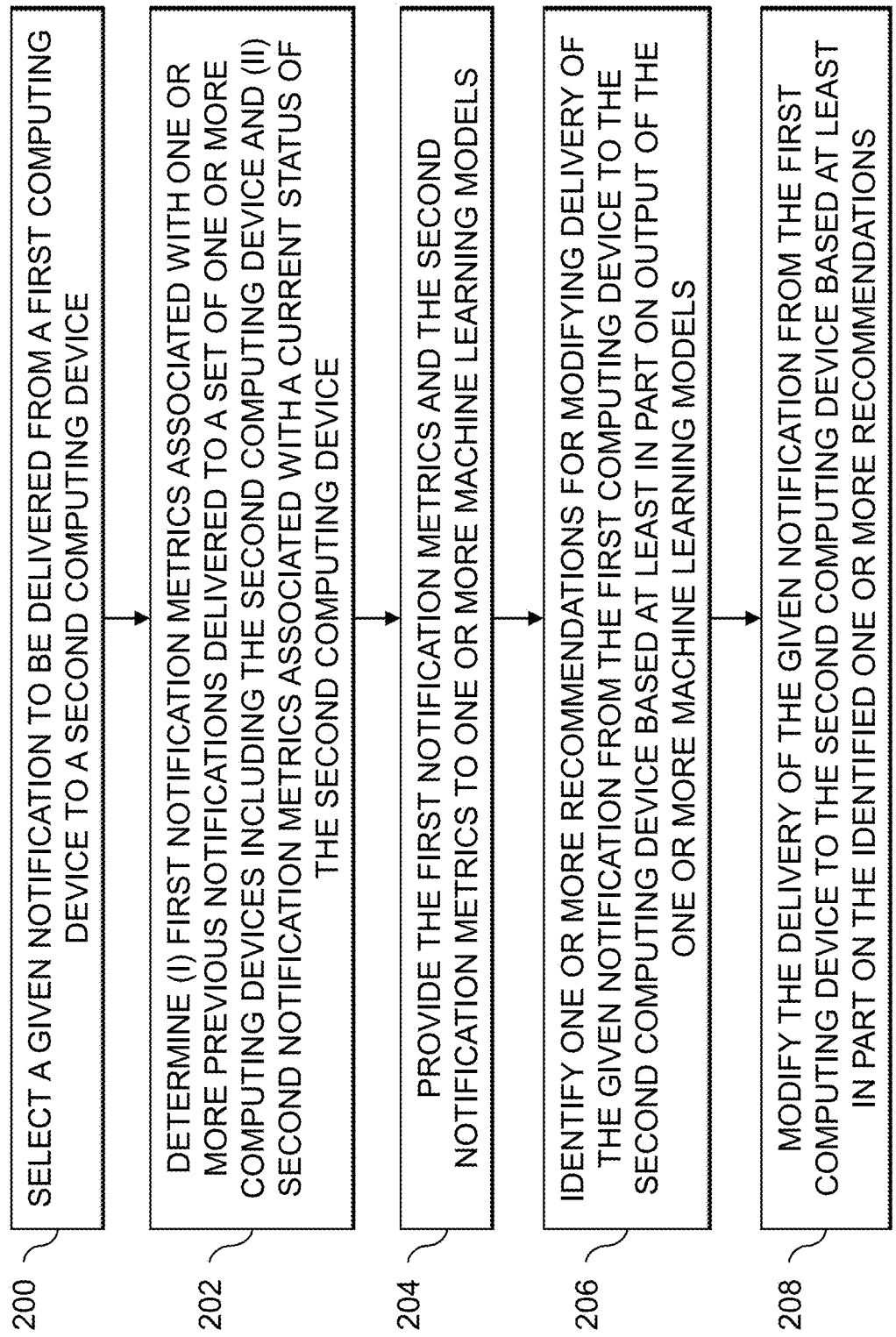
FIG. 2 is a flow diagram of an exemplary process for generating recommendations for modifying the delivery of notifications utilizing machine learning in an illustrative embodiment.

The FIG. 2 process continues with step 204, providing the first notification metrics and the second notification metrics to one or more machine learning models. In step 206, one or more recommendations are identified for modifying delivery of the given notification from the first computing device to the second computing device based at least in part on output of the one or more machine learning models. The one or more machine learning models may comprise a time series algorithm configured to predict one or more times at which a likelihood of the second computing device opening the given notification exceeds a designated threshold, and the one or more recommendations identified in step 206 for modifying the delivery of the given notification from the first computing device to the second computing device may comprise a recommended time at which to deliver the given notification. The one or more machine learning models may also or alternatively comprise a Levenberg-Marquardt algorithm configured to determine at least one of a priority of the given notification relative to one or more other notifications to be delivered to the second computing device and a grouping of the given notification with at least one of the one or more other notifications to be delivered to the second computing device which increases a likelihood of the second computing device opening the given notification by a designated threshold. The one or more recommendations identified in step 206 for modifying the delivery of the given notification from the first computing device to the second computing device comprises at least one of a recommended order in which the given notification and the one or more other notifications should be delivered to the second computing device and a recommended grouping of the given notification with at least one of the one or more other notifications or delivery to the second computing device.

The delivery of the given notification from the first computing device to the second computing device is modified in step 208 based at least in part on the identified one or more recommendations. Modifying the delivery of the given notification from the first computing device to the second computing device in step 208 may comprise modifying at least one of: a time at which the given notification is delivered from the first computing device to the second computing device; a channel by which the given notification is delivered from the first computing device to the second computing device; and a format of the given notification.

Currently, there is a plethora of applications which regularly send large amounts of push notifications on various devices, such as client devices 104 in system 100. Such applications may include, but are not limited to, web-based applications (e.g., that run as part of one or more websites, as part of a client-server application architecture utilizing assets of the IT infrastructure 110), mobile or other applications installed on the client devices 104 (e.g., smartphones, tablets, smartwatches and other wearable devices, laptops, desktops, etc.). Consider, for example, one of the client devices 104 (e.g., client device 104-1) that is a smartphone of a user which typically has dozens of mobile applications installed thereon. Some or all of such applications may push notifications through a notification mechanism of the smartphone (e.g., as provided through a notification application programming interface (API) of an operating system (OS) of the smartphone).

There are various reasons why mobile and other applications send notifications, including but not limited to: increasing user activity; re-engagement of the user; higher conversion rates; staying on top of the user's mind; etc. With regard to increasing user activity, notifications bring customers back to the application that sends the notification. This thus increases the number of daily active users for the application. The number of daily active users may be one of the key performance indicators (KPIs) by which success of the application is measured. With regard to re-engagement of the user, push notifications (e.g., including web-based push notifications, mobile or other application push notifications, etc.) do not require a user's email or other contact details. As such, the use of push notifications permits easier re-engagement of the user. With regard to higher conversion rates, studies have shown that push notifications have significantly higher conversion (e.g., 30 times higher conversion) when compared with email. With regard to staying on top of the user's mind, sending notifications even when the users are not on a website or actively using an application helps an operator of the website or application stay connected with users. This may be particularly advantageous when users have previously engaged with the website or application (e.g., such as a user adding content to a cart on a website but not yet checking out).

Figure 3:
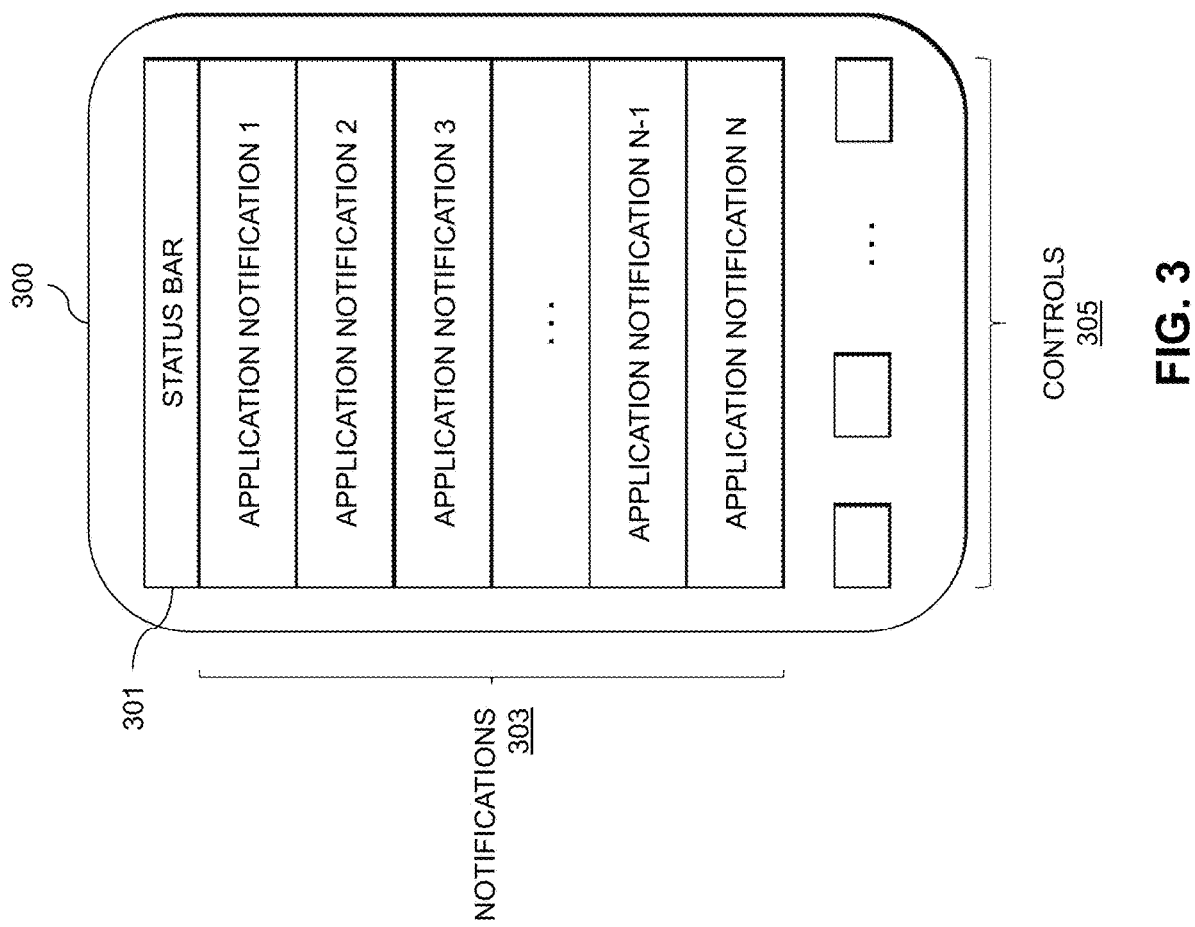
FIG. 3 shows an example of notifications on a mobile device in an illustrative embodiment.

Because of the above-described and other advantages to the use of push notifications, development teams tend to integrate many notifications within their applications. From a user's perspective, however, there has been a multi-fold increase in the number of notifications which users receive on a daily basis from a host of installed applications. This deluge of notifications may annoy users at times. FIG. 3 shows a view of a mobile device 300, where a display thereof includes a status bar 301 that is filled with notifications 303 from various applications installed thereon. The mobile device 300 also includes controls 305 (e.g., buttons or other activatable user-interface features such as touch input).

Application notifications do not come through like emails—if notifications are turned on for a particular application (e.g., a social networking application), the user may receive notifications from that application for just about any activity within that application. As a result, users may be more conscious of which applications they allow to send notifications. This may result, for example, in a user opting-out of notifications, disabling notifications from a notification API or OS of the device (e.g., through settings applications of a smartphone or other device on which applications are installed). In some cases, a user may choose to uninstall an application completely if the notifications become too bothersome. It is difficult for users to distinguish between a buzz or other alert for "important" notifications that need the user's immediate attention and the buzz or other alert for "unimportant" notifications that, from the user's perspective, did not even really need to be pushed through. Moreover, there is a cost involved with each notification that an application sends. Application owners or operators may need this data to be more focused about their audience, resulting in a lose-lose situation for both the application owners or operators and the end users of the applications.

In some cases, priority levels for notifications are available at a per-application level. Techniques are needed, however, for providing more granular control at the level of notification type or category, such that a user is able to silence or block notifications from desired types or categories of notifications from a particular application. Some OSes or devices have functionality for enabling a "Do Not Disturb" or similar mode, where all notifications are blocked. Such functionality, however, requires a user to manually set exceptions at the application level rather than at the content level (e.g., at the level of one or more types or categories of notifications provided by a particular application). In many cases, a user may desire to get some notifications from a given application, but not necessarily all of the applications from the given application. Thus, solutions for per-application level notification control and system-wide "Do Not Disturb" functionality are deficient.

Consider, as an example, a sales application that allows users to create orders, edit opportunities, or search for details while engaging with customers to make sales. Such a sales application may be downloaded and used by all members of a sales team of a particular enterprise. For example, a large enterprise system may have thousands or tens of thousands of users that download a sales application. Such users may provide feedback indicating a desire to receive critical notifications (e.g., notifications relating to changes in sales quotas) but not to receive one or more other types of non-critical notifications (e.g., non-immediate schedule change notifications, such as for meetings several days or weeks in the future). It should be noted that different users may have different definitions of "critical" notifications. For example, a first user may indicate that a first type or category of notifications is critical while a second type or category of notifications is non-critical, and a second user may indicate that the first type of category of notifications is non-critical while the second type or category of notifications is critical. FIG. 4 shows example settings for enabling or disabling notifications for a particular application (e.g., application X) and for setting system-wide or application-wide notification priority settings. For example, application notification settings 401 enable a user to allow or disallow notifications at a per-application level. Notification importance settings 403 enable a user to select the importance of notifications and notification delivery methods (e.g., visual notification, audible alert, pop-up, etc.) at a per-application level.

Illustrative embodiments provide a solution (e.g., the notification management tool 102) for leveraging the power of artificial intelligence (AI) and machine learning (ML) for filtering out all the notifications that don't require a user's immediate attention (e.g., which may in some cases be the majority of all notifications for a particular application or device), letting the user focus on the task at hand. Using the solutions described herein, the user will recognize that if a notification is received (e.g., as indicated by an audible, visual, haptic or other feedback), the notification is likely to be important. This provides numerous advantages. For example, while a user is at work, unimportant notifications will no longer pull the user's focus away from projects and tasks that deserve most of the user's attention. If a user is in a deep state of concentration for a particular task, or if the user is in an important meeting, the user may wish to avoid their devices buzzing or displaying notifications (e.g., chat notifications, future schedule changes, etc.). The user can get back to such things later, allowing the user to devote their entire focus on what is in front of the user at the moment. This will greatly improve the user's mental clarity and performance, while preventing the user from being overwhelmed with non-critical notifications.

In some embodiments, the notification management tool 102 is provided. The notification management tool 102 is configured to automatically predict the priority of a given notification, and the times when the given notification should be sent by a system or a user (e.g., from one or more assets of the IT infrastructure 110 to users of the client devices 104, from one or more assets of the IT infrastructure 110 to other assets in the IT infrastructure 110, from users of the client devices 104 to assets of the IT infrastructure 110, etc.). The notification management tool 102 is further configured to recommend how the notifications should be delivered, and to provide such recommendations to sources of the notifications. The notification management tool 102 may also be configured to control the delivery of the notifications. This may include providing options to users for automating how, when and whether such notifications are delivered. The notification management tool 102 may also be configured to detect varying load on a system (e.g., IT infrastructure 110) at a certain point in time, and asks a system administrator or a system (e.g., a Kubernetes autoscaler) to scale up or down saving cost spent on unused infrastructure. The notification management tool 102 may be further configured to analyze specific user habits and notification engagement patterns (e.g., open habits, timing, connected actions), and to send notifications to such users accordingly. This enables the notification management tool 102 to target users with relevant content that the users are likely to feel more engaged to (e.g., better customer satisfaction (CSAT) and targeted marketing). The AI-enabled predictive engine of the notification management tool 102 may be integrated into a distributed notification platform developed by or utilized by an enterprise. This enables complex enterprise applications to reach out to a large scale of users with varying platforms, devices, etc.

Example optimizations at the receiver and sender ends of notifications will now be described. In the description below, it will be assumed that the client device 104 represent the receiver end of notifications while assets of the IT infrastructure 110 represent the sender end of notifications. At the receivers' end, each time one of the client devices 104 accesses a website or mobile application (e.g., hosted by one or more assets of the IT infrastructure 110) with the notification management tool 102 active (e.g., with a software development kit (SDK) of the notification management tool 102 installed on the client device 104 or otherwise given access for monitoring that client device 102, the notification management tool 102 tracks the last session of the client device 104 and notes the hours in which the client device 104 most commonly returns. This tracking may be based on a rolling average of a user's past actions (on the client device(s) 104 associated with that user) over some defined time period (e.g., three months). When that user enables predictive notifications by the notification management tool 102, the client device(s) 104 associated with that user will receive notifications within 24 hours of initialization. For example, the notification management tool 102 may determine that a given notification will be sent by an application, website or other asset of the IT infrastructure 110 at 7:00 PM on a Monday, but that a user of the client device 104-1 is not likely to open the associated application or website on the client device 104-1 at 1:00 PM on Tuesday. In this case, the notification management tool 102 may recommend that the given notification be delivered 18 hours later (e.g., at 1:00

PM on Tuesday, rather than 7:00 PM on Monday). If, however, the notification management tool 102 determines that the given notification is highly time-sensitive, the notification management tool 102 may recommend that the given notification be sent immediately (e.g., the given notification is delivered right away to all affected users and their client devices 104 regardless of time zone) or based on time zone (e.g., the given notification is delivered at the same time across user time zones, such as at 9:00 AM in each time zone).

At the sender's end, the notification management tool 102 tracks which channels and users are performing better by monitoring various actions performed by a set of users of the client devices 104 on notifications that have already been sent. In some embodiments, this includes analyzing work profile settings (e.g., using VMware Workspace™ ONE™ or another suitable tool). Such settings may include identifying whether particular users have "Do Not Disturb" or offline status set on their associated client devices 104. Through such analysis, the notification management tool 102 may estimate whether it is worth spending resources on particular notifications (e.g., worth spending marketing money on, as there may be a monetary cost associated with delivery of notifications such as targeted advertising, such as the cost of compute, storage and network resources involved in delivering the notifications, costs charged by operators for delivery of notifications through channels controlled by such operators, etc.). The notification management tool 102 may further provide functionality for intelligent prioritization and regrouping of notifications. This may include, but is not limited to: identifying wasted bandwidth (e.g., notifications) that fail to acquire or attract users and assign lower weight to such notifications; analyzing the content of notifications to group notifications smartly to reduce bandwidth use and frequent pinging; identifying notification types most suitable for a communication channel or user based on previous engagement patterns (e.g., image, long text, short text, voice over IP (VoIP), etc.); and identifying what geographies perform better for certain types or categories of notifications.

The notification management tool 102 is thus able to optimize return on investment (ROI) for senders of notifications, using recent channel performance and user statistics (e.g., per-channel) to predict campaign value (e.g., predict success of a notification based on previous notification campaigns). Success of a notification campaign may be based, at least in part, on determining the rate at which notifications are opened versus dismissed. The notification management tool 102 may also recommend push amplification, or finding other mediums or channels for delivering notifications. For example, in cases where a user is already using an application and a notification is to be delivered by that application, the notification management tool 102 may modify the notification such that it is delivered as a pop-up or in-application alert to get the user's immediate attention rather than having the user check the notification from a status or notification bar.

For sender's end optimization, a number of data selection parameters may be used. The data selection parameters may include, but are not limited to: profile settings (e.g., DND, offline, focus mode, etc.); selection preferences (e.g., segmentation via channels); notifications (e.g., read receipts, sent receipts, success ratio, actions performed, ping time, grouping); user data (e.g., geographic location data, application usage data, average session time, activity, specific preferences); previous campaigns (e.g., historical data of previous campaign success or failure, which may include various metrics). Various different algorithms may be used by the notification management tool 102 to control delivery of notifications. Time series algorithms may be used to intelligently predict the most optimized delivery times for notifications. Neural networks may be utilized for determining the types or categories of notifications that are critical and non-critical, among other tasks. In some embodiments, the neural networks are implemented using a Levenberg-Marquardt algorithm, also referred to as a damped least-squares method. The damped least-squares method is designed to work specifically with loss functions which take the form of a sum of squared errors. The damped least-squares method works without computing an exact Hessian matrix, and instead works with the gradient vector and the Jacobian matrix.

It should be noted that embodiments are not limited solely to use with the damped least-squares method or Levenberg-Marquardt neural network algorithm. Various other types of neural network algorithms may be utilized, including but not limited to gradient-descent and conjugate gradient algorithms. The choice of which neural network algorithm to utilize may be based on the amount of memory or other resources available.

Figure 5:
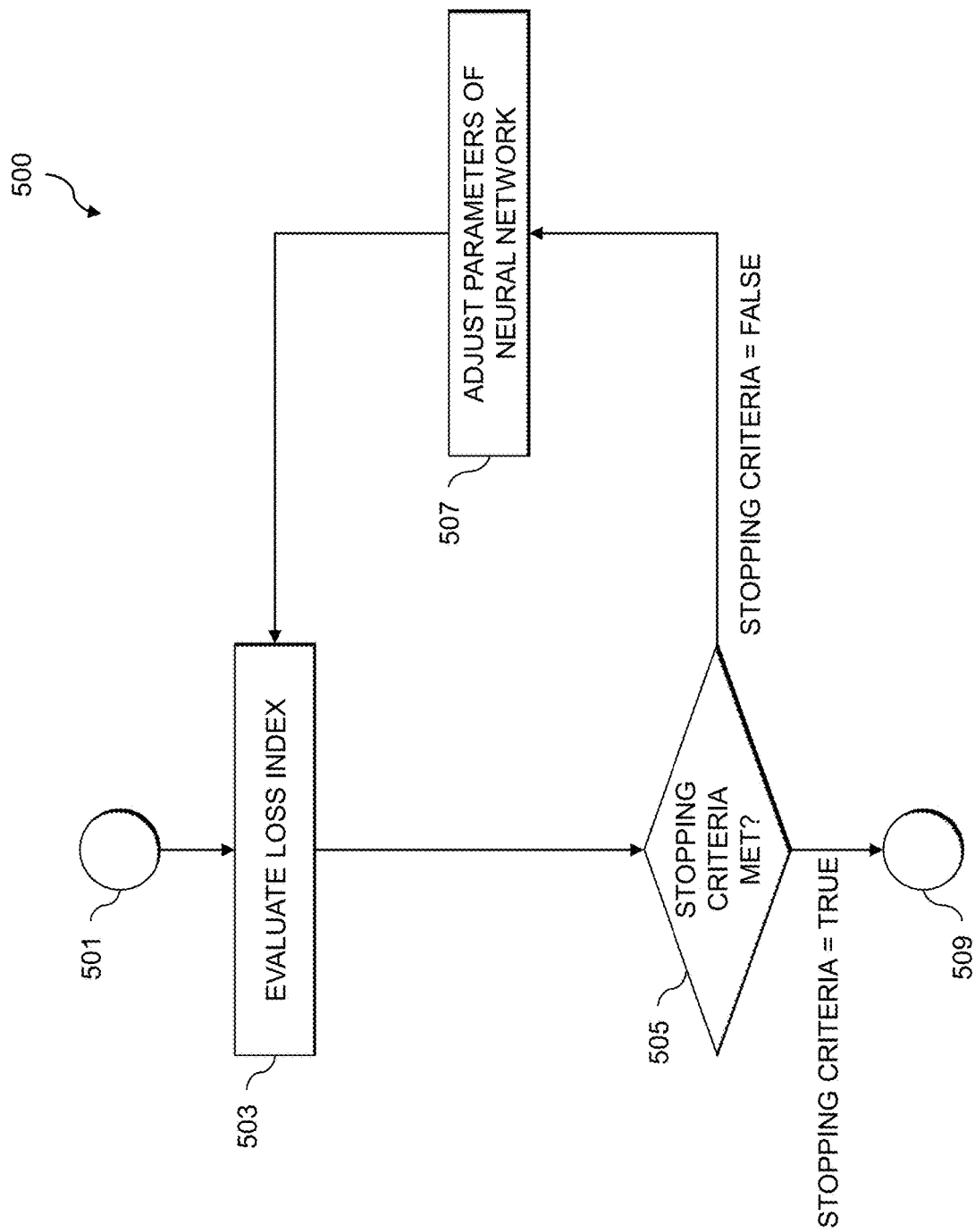
FIG. 5 shows a process flow for training a machine learning model to generate recommendations for modifying the delivery of notifications in an illustrative embodiment.

FIG. 5 shows a process flow 500 for training a neural network for sender end optimization. In this example, the neural network is implemented using a damped least-squares method or Levenberg-Marquardt algorithm. The process flow begins 501, and a loss index is evaluated in step 503. The loss index may be evaluated using a loss function expressed as a sum of squared errors. This may include defining a Jacobian matrix of the loss function, which contains derivatives of the errors of the parameters of the neural network. In step 505, a determination is made as to whether stopping criteria is met. While the stopping criteria is false, various parameters of the neural network may be adjusted and improved in an iterative process by repeating step 507. Step 507 may include, for example, calculating gradients, calculating Hessian approximation, adjusting damping parameters, adjusting damping factors, etc. In some embodiments, step 507 includes finding the loss and a gradient vector for the loss function, and then computing an approximation of the Hessian matrix. The damping factor may then be adjusted to reduce the loss for a current iteration.

The notification management tool 102 utilizes the notification activity monitoring module 112 to monitor delivery of notifications (e.g., from assets of the IT infrastructure 110 to client devices 104), as well as how the client devices 104 utilize the notifications (e.g., whether the client devices open or dismiss the notifications) and access and usage patterns of the client devices 104. The notification activity monitoring module 112 may also monitor aspects of senders of the notifications (e.g., assets of the IT infrastructure 110) to determine how and when notifications are generated and delivered, the cost of notification delivery, etc.

The notification management tool 102 utilizes the machine learning-based notification delivery recommendation module 114 to train and utilize a neural network to make recommendations as to how to modify future delivery of notifications from notification senders (e.g., assets of the IT infrastructure 110) to notification receivers (e.g., client devices 104). The machine learning-based notification delivery recommendation module 114 may utilize a Levenberg-Marquardt algorithm as described above. The notification delivery configuration module 116 may present the recommendations for how to modify delivery of notifications to the notification receivers, and then modify the delivery of notifications responsive to user accepting or rejecting the recommendations. In some embodiments, the notification delivery configuration module 116 may automatically accept or reject the recommendations rather than requiring user input to make the modifications.

Conventional techniques for notification management have various disadvantages. For example, platforms such as Google Cloud Messaging (GCM) and Firebase enable notification integrations across many kinds of applications. While GCM and Firebase have a variety of features, they do not have functionality for AI-based notification delivery as described herein. As another example, Azure Notifications Hub lacks AI-based capabilities for intelligent delivery and cost optimizations for notification management. As a further example, Amazon Simple Notification Service (SNS) provides a managed publish-subscription messaging service but lacks AI-based capabilities for intelligent delivery and cost optimizations for notification management.

Illustrative embodiments provide a number of advantages relative to such conventional techniques, including but not limited to providing functionality for optimizing notification delivery time based on when each user most frequently accesses an application or website, and the best communication channel for notifications to optimize notification open rates. Strategic algorithms are provided for optimizing notification receiver experience. From the sender's perspective, intelligent notification prioritization and regrouping strategies are uniquely positioned to increase target rates. Some embodiments also provide cost and ROI optimizations through analysis of a number of previous notification campaigns (e.g., with the amount of data points that the neural network algorithm uses, which may be a Levenberg-Marquardt based neural network).

As a further advantage, the notification management tool 102 described herein may be implemented in a variety of contexts. For example, an enterprise mobility team may serve a wide variety of internal and external users and associated applications. Such consuming applications may send thousands of notifications per day. The notification management tool 102 described herein may be integrated into such an enterprise platform, enabling the enterprise to help users (both senders and receivers of notifications) to optimize daily interactions with websites and applications and only provide the users with needed or desired information. Moreover, since there may be a cost involved in sending notifications via third-party services, the enterprise is able to save significant resources by optimally reducing the amount of notifications sent on a regular basis. For example, consumer mobile applications such as a mobile sales application with a potentially large userbase (e.g., thousands, millions, etc.) will be able to benefit from use of the notification management tool 102 described herein. AI capabilities of the notification management tool 102 provide alignment with intelligent optimization and may be used to increase productivity of an enterprise and its users, including in situations where an enterprise uses dozens or different applications which send thousands of notifications daily.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating recommendations for modifying the delivery of notifications utilizing machine learning will now be described in greater detail with reference to FIGS. 6 and 7. Although described in the context of system 100, these platforms may also be used to implement at least portions of other information processing systems in other embodiments.

Figure 6:
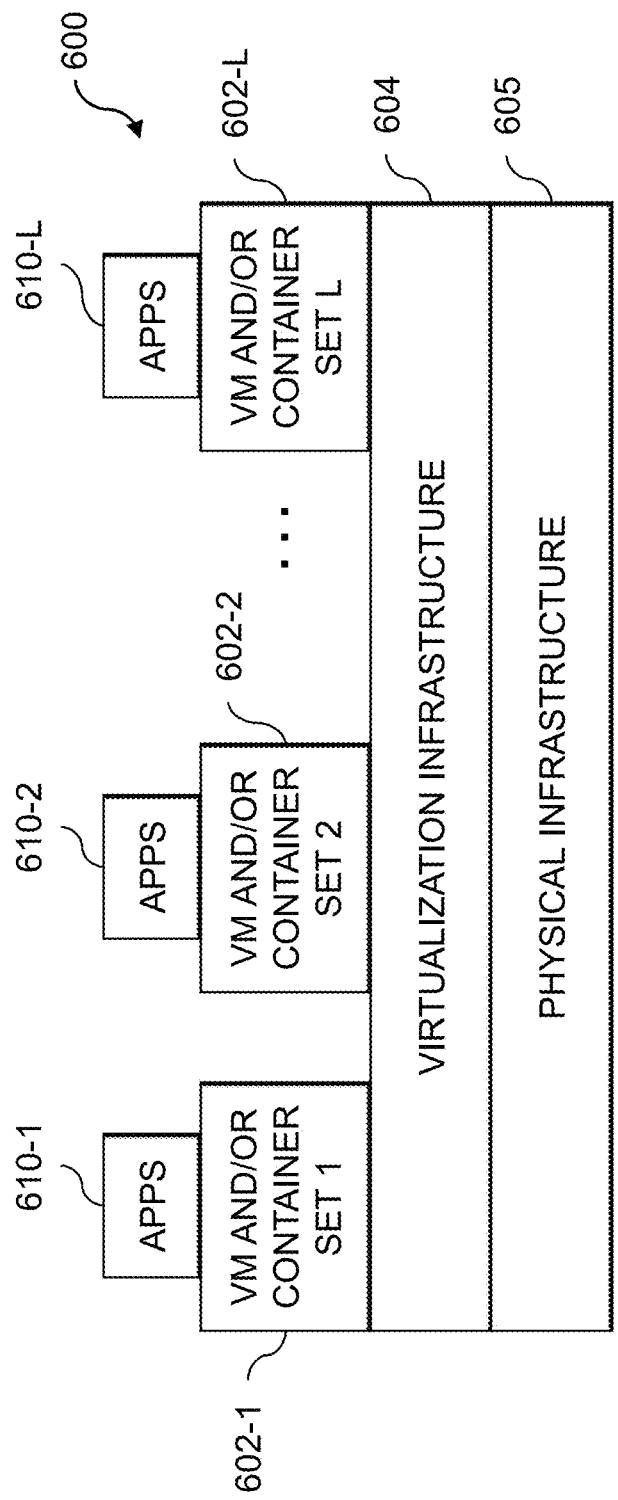
FIGS. 6 and 7 show examples of processing platforms that may be utilized to implement at least a portion of an information processing system in illustrative embodiments.
Figure 7:
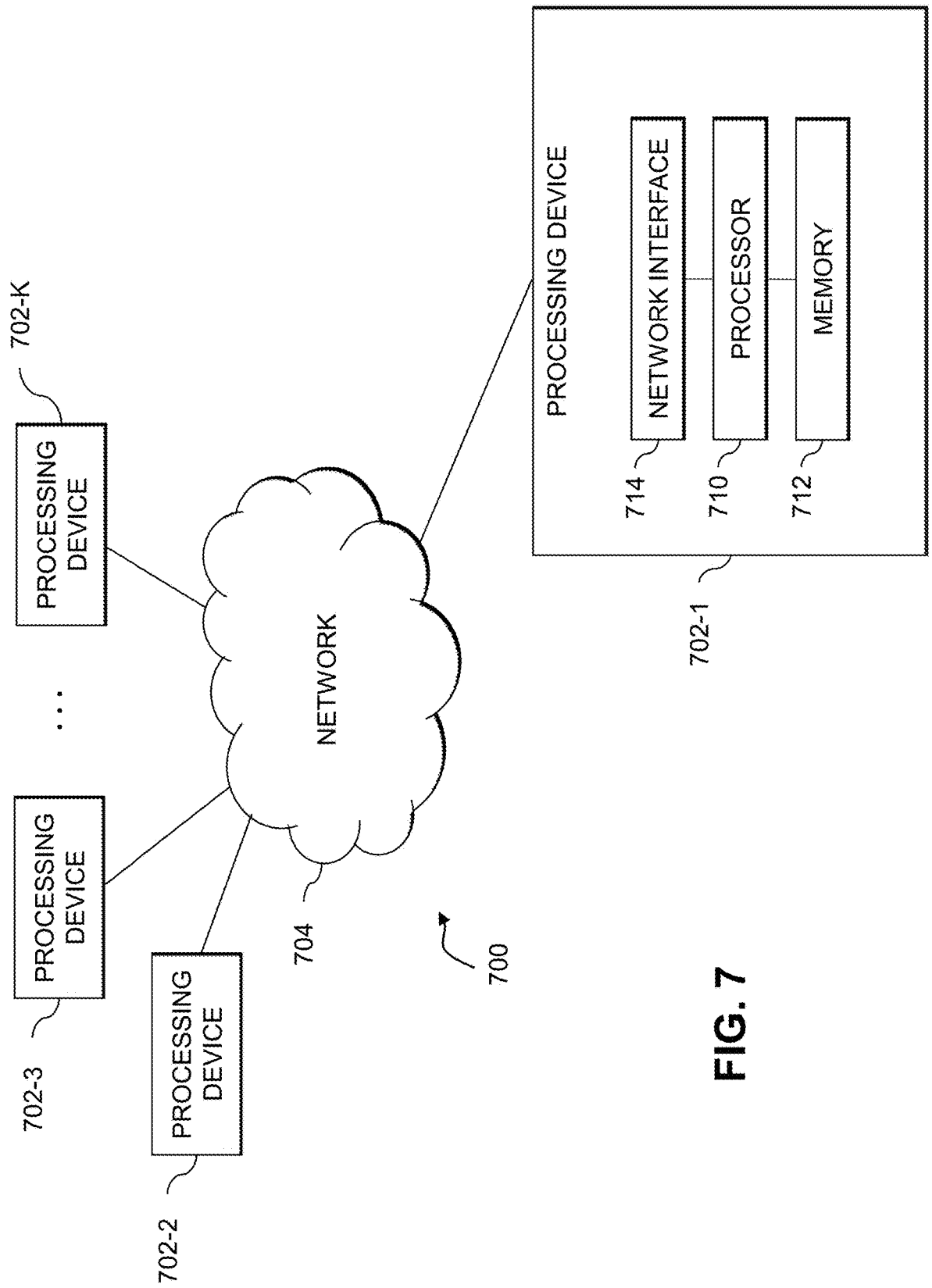

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating recommendations for modifying the delivery of notifications utilizing machine learning as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, notifications, machine learning algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        selecting a given notification to be delivered from a first computing device to a second computing device;
        determining (i) first notification metrics associated with one or more previous notifications delivered to a set of one or more computing devices including the second computing device and (ii) second notification metrics associated with a current status of the second computing device;
        providing the first notification metrics and the second notification metrics to one or more machine learning models;
        identifying one or more recommendations for modifying delivery of the given notification from the first computing device to the second computing device based at least in part on output of the one or more machine learning models; and
        modifying the delivery of the given notification from the first computing device to the second computing device based at least in part on the identified one or more recommendations;
    wherein the first notification metrics indicate one or more characteristics of at least a subset of the one or more previous notifications, the one or more characteristics comprising, for a given one of the one or more previous notifications, a first proportion of recipients of the given previous notification that opened the given previous notification and a second proportion of the recipients of the given notification that did not open the given previous notification.

2. The apparatus of claim 1 wherein the one or more characteristics for the given previous notification further comprise, for each of two or more different communication channels over which the given previous notification was delivered, the first proportion of the recipients of the given previous notification that opened the given previous notification and the second proportion of the recipients of the given previous notification that did not open the given previous notification.

3. The apparatus of claim 1 wherein the one or more characteristics for the given previous notification further comprise, for each of two or more different notification formats of the given previous notification, the first proportion of the recipients of the given previous notification that opened the given previous notification and the second proportion of the recipients of the given previous notification that did not open the given previous notification.

4. The apparatus of claim 1 wherein the one or more characteristics for the given previous notification further comprise, for each of two or more different geographic regions to which the given previous notification was delivered, the first proportion of the recipients of the given previous notification that opened the given previous notification and the second proportion of the recipients of the given previous notification that did not open the given previous notification.

5. The apparatus of claim 1 wherein the one or more characteristics for the given previous notification further comprise, for each of two or more different notification categories associated with the given previous notification, the first proportion of the recipients of the given previous notification that opened the given previous notification and the second proportion of the recipients of the given previous notification that did not open the given previous notification.

6. The apparatus of claim 1 wherein determining the second notification metrics comprises determining whether the second computing device is at least one of offline and has a do not disturb status enabled.

7. The apparatus of claim 1 wherein determining the second notification metrics comprises determining notification delivery preferences of the second computing device for each of one or more notification categories.

8. The apparatus of claim 1 wherein determining the second notification metrics comprises determining at least one of one or more applications utilized by the second computing device and an average application session time for the one or more applications utilized by the second computing device.

9. The apparatus of claim 1 wherein the second notification metrics comprise at least one of a current location of the second computing device and a predicted location of the second computing device at a time at which the given notification is scheduled to be delivered from the first computing device to the second computing device.

10. The apparatus of claim 1 wherein the one or more machine learning models comprise a time series algorithm configured to predict one or more times at which a likelihood of the second computing device opening the given notification exceeds a designated threshold, and wherein the one or more recommendations for modifying the delivery of the given notification from the first computing device to the second computing device comprise a recommended time at which to deliver the given notification.

11. The apparatus of claim 1 wherein the one or more machine learning models comprise a Levenberg-Marquardt algorithm configured to determine at least one of a priority of the given notification relative to one or more other notifications to be delivered to the second computing device and a grouping of the given notification with at least one of the one or more other notifications to be delivered to the second computing device which increases a likelihood of the second computing device opening the given notification by a designated threshold, wherein the one or more recommendations for modifying the delivery of the given notification from the first computing device to the second computing device comprises at least one of a recommended order in which the given notification and the one or more other notifications should be delivered to the second computing device and a recommended grouping of the given notification with at least one of the one or more other notifications or delivery to the second computing device.

12. The apparatus of claim 1 wherein modifying the delivery of the given notification from the first computing device to the second computing device comprises modifying at least one of:
a time at which the given notification is delivered from the first computing device to the second computing device;
a channel by which the given notification is delivered from the first computing device to the second computing device; and
a format of the given notification.

13. The apparatus of claim 1 wherein the one or more characteristics further comprise at least one of: notification categories of the subset of the one or more previous notifications that were opened and dismissed by the set of one or more computing devices; opening times of the subset of the one or more previous notifications by the set of one or more computing devices; and dismissing times of the subset of the one or more previous notifications by the set of one or more computing devices.

14. An apparatus comprising:
at least one processing device comprising a processor coupled to a memory;
the at least one processing device being configured to perform steps of:
selecting a given notification to be delivered from a first computing device to a second computing device;
determining (i) first notification metrics associated with one or more previous notifications delivered to a set of one or more computing devices including the second computing device and (ii) second notification metrics associated with a current status of the second computing device:
providing the first notification metrics and the second notification metrics to one or more machine learning models;
identifying one or more recommendations for modifying delivery of the given notification from the first computing device to the second computing device based at least in part on output of the one or more machine learning models; and
modifying the delivery of the given notification from the first computing device to the second computing device based at least in part on the identified one or more recommendations;
wherein a first one of the first notification metrics characterizes times at which the second computing device opened and dismissed notifications during a historical time period and a second one of the first notification metrics characterizes notification categories of notifications which the second computing device opened and dismissed during the historical time period.

15. A computer program product comprising a non-transitory processor-readable storage medium having stored therein program code of one or more software programs, wherein the program code when executed by at least one processing device causes the at least one processing device to perform steps of:
selecting a given notification to be delivered from a first computing device to a second computing device;
determining (i) first notification metrics associated with one or more previous notifications delivered to a set of one or more computing devices including the second computing device and (ii) second notification metrics associated with a current status of the second computing device;
providing the first notification metrics and the second notification metrics to one or more machine learning models;
identifying one or more recommendations for modifying delivery of the given notification from the first computing device to the second computing device based at least in part on output of the one or more machine learning models; and
modifying the delivery of the given notification from the first computing device to the second computing device based at least in part on the identified one or more recommendations;
wherein the first notification metrics indicate one or more characteristics of at least a subset of the one or more previous notifications, the one or more characteristics comprising, for a given one of the one or more previous notifications, a first proportion of recipients of the given previous notification that opened the given previous notification and a second proportion of the recipients of the given notification that did not open the given previous notification.

16. The computer program product of claim 15 wherein the one or more machine learning models comprise a time series algorithm configured to predict one or more times at which a likelihood of the second computing device opening the given notification exceeds a designated threshold, and wherein the one or more recommendations for modifying the delivery of the given notification from the first computing device to the second computing device comprise a recommended time at which to deliver the given notification.

17. The computer program product of claim 15 wherein the one or more machine learning models comprise a Levenberg-Marquardt algorithm configured to determine at least one of a priority of the given notification relative to one or more other notifications to be delivered to the second computing device and a grouping of the given notification with at least one of the one or more other notifications to be delivered to the second computing device which increases a likelihood of the second computing device opening the given notification by a designated threshold, wherein the one or more recommendations for modifying the delivery of the given notification from the first computing device to the second computing device comprises at least one of a recommended order in which the given notification and the one or more other notifications should be delivered to the second computing device and a recommended grouping of the given notification with at least one of the one or more other notifications or delivery to the second computing device.

18. A method comprising:
  selecting a given notification to be delivered from a first computing device to a second computing device;
  determining (i) first notification metrics associated with one or more previous notifications delivered to a set of one or more computing devices including the second computing device and (ii) second notification metrics associated with a current status of the second computing device;
  providing the first notification metrics and the second notification metrics to one or more machine learning models;
  identifying one or more recommendations for modifying delivery of the given notification from the first computing device to the second computing device based at least in part on output of the one or more machine learning models; and
  modifying the delivery of the given notification from the first computing device to the second computing device based at least in part on the identified one or more recommendations;
  wherein the first notification metrics indicate one or more characteristics of at least a subset of the one or more previous notifications, the one or more characteristics comprising, for a given one of the one or more previous notifications, a first proportion of recipients of the given previous notification that opened the given previous notification and a second proportion of the recipients of the given notification that did not open the given previous notification; and
  wherein the method is performed by at least one processing device comprising a processor coupled to a memory.

19. The method of claim 18 wherein the one or more machine learning models comprise a time series algorithm configured to predict one or more times at which a likelihood of the second computing device opening the given notification exceeds a designated threshold, and wherein the one or more recommendations for modifying the delivery of the given notification from the first computing device to the second computing device comprise a recommended time at which to deliver the given notification.

20. The method of claim 18 wherein the one or more machine learning models comprise a Levenberg-Marquardt algorithm configured to determine at least one of a priority of the given notification relative to one or more other notifications to be delivered to the second computing device and a grouping of the given notification with at least one of the one or more other notifications to be delivered to the second computing device which increases a likelihood of the second computing device opening the given notification by a designated threshold, wherein the one or more recommendations for modifying the delivery of the given notification from the first computing device to the second computing device comprises at least one of a recommended order in which the given notification and the one or more other notifications should be delivered to the second computing device and a recommended grouping of the given notification with at least one of the one or more other notifications or delivery to the second computing device.

* * * * *